(12) United States Patent
Sun

(10) Patent No.: US 12,272,132 B2
(45) Date of Patent: Apr. 8, 2025

(54) METHODS AND SYSTEMS FOR SELECTING DATA PROCESSING MODELS

(71) Applicant: SHANGHAI UNITED IMAGING HEALTHCARE CO., LTD., Shanghai (CN)

(72) Inventor: Haohua Sun, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 202 days.

(21) Appl. No.: 17/644,790

(22) Filed: Dec. 17, 2021

(65) Prior Publication Data

US 2023/0030595 A1 Feb. 2, 2023

(30) Foreign Application Priority Data

Jul. 28, 2021 (CN) .......................... 202110858595.4

(51) Int. Cl.
*G06V 10/70* (2022.01)
*G06V 10/774* (2022.01)
*G06V 10/776* (2022.01)

(52) U.S. Cl.
CPC ............ *G06V 10/87* (2022.01); *G06V 10/774* (2022.01); *G06V 10/776* (2022.01)

(58) Field of Classification Search
CPC .... G06V 10/87; G06V 10/774; G06V 10/776; G06V 2201/03
See application file for complete search history.

(56) References Cited

U.S. PATENT DOCUMENTS

| | | | |
|---|---|---|---|
| 2019/0026608 A1* | 1/2019 | Hsieh | G06N 3/084 |
| 2019/0130565 A1* | 5/2019 | Lee | G06N 3/08 |
| 2019/0370587 A1* | 12/2019 | Burachas | G06T 11/60 |
| 2019/0392547 A1* | 12/2019 | Katouzian | G06V 20/62 |
| 2020/0027530 A1* | 1/2020 | Boroczky | G16H 10/20 |
| 2020/0125900 A1* | 4/2020 | Posner | G06F 18/2433 |
| 2020/0160510 A1* | 5/2020 | Lindemer | G06F 40/216 |
| 2020/0250472 A1* | 8/2020 | Abhyankar | G06F 18/2411 |
| 2020/0320381 A1* | 10/2020 | Venkatraman | G06Q 10/067 |
| 2021/0065053 A1* | 3/2021 | Higgins | G06F 9/542 |
| 2021/0081725 A1* | 3/2021 | Qian | G06F 18/214 |

FOREIGN PATENT DOCUMENTS

CN 111599474 A 8/2020

* cited by examiner

*Primary Examiner* — Kathleen M Broughton
(74) *Attorney, Agent, or Firm* — METIS IP LLC

(57) ABSTRACT

Systems and methods for determining a target data processing model is provided. The methods may include obtaining a data set including data to be processed by a target data processing model; processing the data set using an evaluation model to obtain an evaluation result for each of a plurality of candidate data processing models, the evaluation model being a trained machine learning model; and determining, from the plurality of candidate data processing models, the selected data processing model based on the evaluation results.

17 Claims, 8 Drawing Sheets

700

Obtaining a plurality of training samples   710

Training an initial evaluation model based on the plurality of training samples to obtain a trained evaluation model   720

Fig. 7

METHODS AND SYSTEMS FOR SELECTING DATA PROCESSING MODELS

CROSS-REFERENCE TO RELATED APPLICATIONS

This application claims priority to Chinese patent application No. 202110858595.4, filed on Jul. 28, 2021, the entire content of which is incorporated herein by reference.

TECHNICAL FIELD

This application relates to the field of data processing, in particular to methods and systems for selecting data processing models.

BACKGROUND

In recent years, machine learning models have been widely used in various operations in the data processing process. For example, in the medical field, deep learning methods may be applied to medical data collection, data correction, image reconstruction, image post-processing, diagnostic analysis, or the like. For some data processing operations, when the same processing data model is used to process different data, the results may be inaccurate due to the greater specificity of the data. Therefore, it is necessary to provide a method for selecting data processing models in order to obtain more accurate data processing results.

SUMMARY

According to an aspect of the present disclosure, a method for determining a target data processing model is provided. The method may be implemented on a computing device having at least one processor and at least one non-transitory storage medium. The method may include obtaining a data set including data to be processed by a target data processing model; processing the data set using an evaluation model to obtain an evaluation result for each of a plurality of candidate data processing models, the evaluation model being a trained machine learning model; and determining, from the plurality of candidate data processing models, the selected data processing model based on the evaluation results.

In some embodiments, the data set may include characteristic data, and the determining the selected data processing model based on the evaluation results may include selecting, from the plurality of candidate data processing models, one or more reference data processing models based on the characteristic data; and determining, from the plurality of reference data processing models, the target data processing model based on the evaluation results of the one or more reference data processing models.

In some embodiments, the target data processing model may be used for medical imaging technique, and the characteristic data may include one or more of: scanning parameters of a medical imaging device, image reconstruction parameters, a region of interest of a subject to be examined, or characteristic information of the subject.

In some embodiments, the method may include obtaining a user input; selecting, from the plurality of candidate data processing models, one or more reference data processing models based on the user input; and determining, from the plurality of reference data processing models, the target data processing model based on the evaluation results of the one or more reference data processing models.

In some embodiments, the evaluation model may be obtained by operations including obtaining a plurality of training samples each including a sample data set and a sample evaluation result for at least one candidate data processing model of the plurality of candidate data processing models, wherein the sample evaluation result is determined based on a result of processing the sample data set using the at least one candidate data processing model; and obtaining the evaluation model by training an initial evaluation model based on the plurality of training samples.

In some embodiments, the plurality of candidate processing models may include machine learning models, and at least two of the plurality of candidate processing models are different in model structure or model parameters.

In some embodiments, the evaluation model may include a logistic regression model, a support vector machine model, a Bayesian model, a K-nearest neighbor model, a decision tree model, a random forest model, a gradient Boosting model, a neural network, a deep neural network, a recursive neural network, a recurrent neural network, or a convolutional network.

In some embodiments, the target data processing model may be used for one or more of: medical data acquisition, medical image reconstruction, medical image denoising, motion artifact correction for a medical image, metal artifact correction for a medical image, scatter correction for a medical image, medical image segmentation, or medical diagnosis.

In some embodiments, the method may further include processing the data set using the target data processing model to obtain a data processing result; and causing a terminal device to present the data processing result to a user.

In some embodiments, the method may further include obtaining, from the terminal device, a user input indicating that the data processing result is unsatisfactory, determining, from the plurality of candidate data processing models, a replacing target data processing model that is different from the target data processing model.

According to another aspect of the present disclosure, a system is provided. The system may include at least one non-transitory storage medium including a set of instructions for determining a target data processing model; and at least one processor in communication with the at least one non-transitory storage medium. When executing the set of instructions, the at least one processor is configured to cause the system to perform operations including: obtaining a data set including data to be processed by a target data processing model; processing the data set using an evaluation model to obtain an evaluation result for each of a plurality of candidate data processing models, the evaluation model being a trained machine learning model; and determining, from the plurality of candidate data processing models, the selected data processing model based on the evaluation results.

According to yet another aspect, a non-transitory computer readable medium is provided. The non-transitory computer readable medium may include at least one set of instructions. When executed by at least one processor of a computing device, the at least one set of instructions may direct the at least one processor to perform operations including obtaining a data set including data to be processed by a target data processing model; processing the data set using an evaluation model to obtain an evaluation result for each of a plurality of candidate data processing models, the evaluation model being a trained machine learning model;

and determining, from the plurality of candidate data processing models, the selected data processing model based on the evaluation results.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 7 is a flowchart illustrating an exemplary method for training an evaluation model according to some embodiments of the present disclosure.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, sections or assemblies of different levels in ascending order. However, the terms may be displaced by another expression if they achieve the same purpose.

Figure 2:
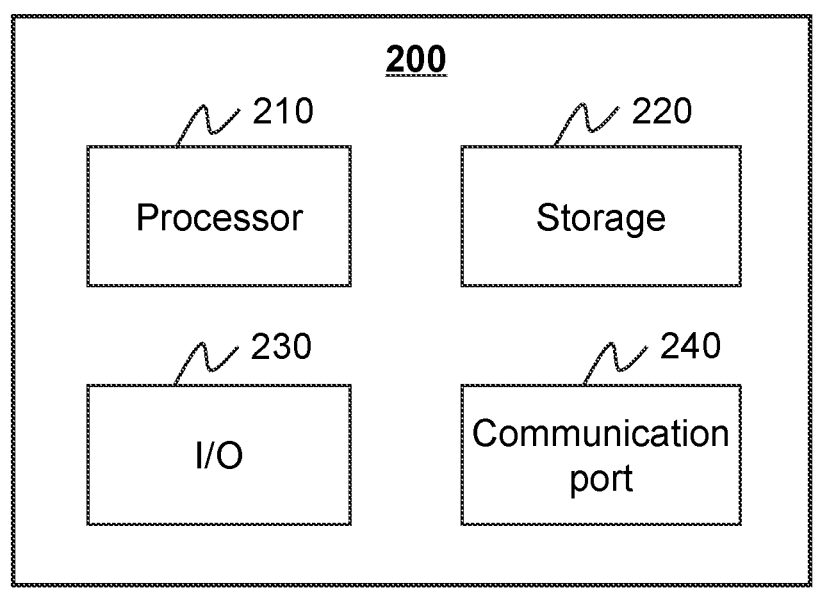
FIG. 2 is a schematic diagram illustrating exemplary hardware and/or software components of an exemplary computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module, or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are systems and components for an imaging system. In some embodiments, the imaging system may include a single modality imaging system and/or a multi-modality imaging system. The single modality imaging system may include, for example, an X-ray imaging system, an computed tomography (CT) system, a magnetic resonance imaging (MRI) system, an ultrasonography system, a positron emission tomography (PET) system, or the like, or any combination thereof. The multi-modality imaging system may include, for example, an X-ray imaging-magnetic resonance imaging (X-ray-MRI) system, a positron emission tomography-X-ray imaging (PET-X-ray) system, a single-photon emission computed tomography-magnetic resonance imaging (SPECT-MRI) system, a positron emission tomography-computed tomography (PET-CT) system, a C-arm system, a digital subtraction angiography-magnetic resonance imaging (DSA-MRI) system, etc. It should be noted that the imaging system described below is merely provided for illustration purposes, and not intended to limit the scope of the present disclosure.

Figure 1:
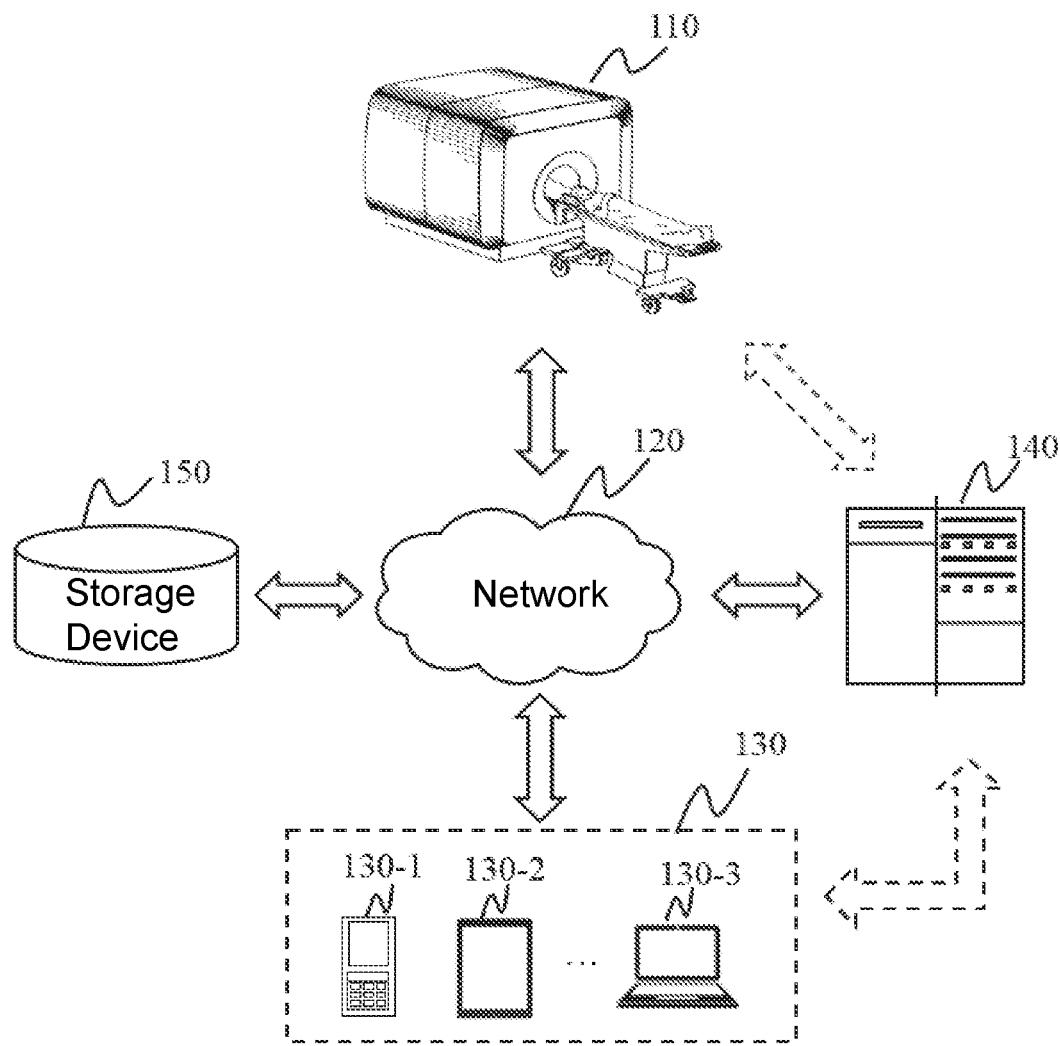
FIG. 1 is a diagram of a medical imaging system according to some embodiments of the present disclosure.

FIG. 1 is a diagram of a medical imaging system according to some embodiments of the present disclosure.

As shown in FIG. 1, a medical imaging system 100 may include a medical device 110, a network 120, a terminal device 130, a processing device 140, and a storage device 150. Various assemblies in the system 100 may be connected to each other through the network 120. For example, the medical device 110 may be connected to or in communication with the terminal device 130 via the network 120. As another example, the medical device 110 may be connected to or in communication with the storage device 150 via the network 120.

The medical device 110 may be configured to scan a target object in a detection area to obtain scan data of the target object. In some embodiments, the target object may include a biological object and/or a non-biological object. For example, the target object may include a specific part of the body, such as the head, the chest, the abdomen, or the like, or a combination thereof. As another example, the target object may be an artificial composition of animate or inanimate organic and/or inorganic substances. In some embodiments, the medical image data related to the target object may include projection data of the target object, one or more scanned images, or the like.

In some embodiments, the medical device 110 may be a non-invasive biomedical imaging device used for disease diagnosis or research purposes. For example, the medical device 110 may include a single-mode scanner and/or a multi-mode scanner. The single-mode scanner may include, for example, an ultrasound scanner, an X-ray scanner, a computed tomography (CT) scanner, a magnetic resonance imaging (MRI) scanner, an ultrasound detector, a positron emission tomography (PET) scanner, an optical coherence tomography (OCT) scanner, an intravascular ultrasound (IVUS) scanner, a near-infrared spectroscopy (NIRS) scanner, a far-infrared (FIR) scanner, or the like, or any combination thereof. The multi-mode scanner may include, for example, an X-ray imaging-magnetic resonance imaging (X-ray-MRI) scanner, a positron emission tomography-X-ray imaging (PET-X-ray) scanner, a single-photon emission computed tomography-nuclear magnetic resonance imaging (SPECT-MRI) scanner, a positron emission tomography-computed tomography (PET-CT) scanner, a digital subtraction angiography-magnetic resonance imaging (DSA-MRI) scanner, or the like. The scanners mentioned above are only for illustrative purposes, which is not intended to limit the scope of the present disclosure. As used herein, the term "imaging modality" or "modality" broadly refers to an imaging method or technique for collecting, generating, processing, and/or analyzing imaging information of the target object.

In some embodiments, the medical device 110 may include modules and/or assemblies for performing imaging and/or related analysis. For example, the medical device 110 may be an MRI scanner and may include components used for imaging such as magnets, coils (such as gradient coils and/or RF coils), or the like. The medical device 110 may also include an image obtaining device (such as a depth camera), a processor (such as the processing device 140), or the like. In some embodiments, the image obtaining device may be used to obtain image information. For example, the image obtaining device may obtain an image including all and/or part of the target object. In some embodiments, the image obtaining device may include a camera (e.g., a digital camera, an analog camera, a depth camera, etc.), a red-green-blue (RGB) sensor, an RGB depth (RGB-D) sensor, or other devices that may collect image data of objects in a clinic. In some embodiments, two or more image-obtaining devices may be installed. The installation positions and installation methods of the two or more image obtaining devices may be any combination of a plurality of installation positions and installation methods mentioned above. For example, the two image obtaining devices may be installed on the medical device 110 at positions corresponding to two through holes on a coil.

In some embodiments, the image data obtained by the medical device 110 (e.g., the image of the target object taken by the image obtaining device, and/or the medical image of the target object) may be transmitted to the processing device 140 for further analysis. Additionally or alternatively, the image data obtained by the medical device 110 may be sent to a terminal device (e.g., the terminal device 130) for display and/or a storage device (e.g., the storage device 150) for storage.

The network 120 may include any suitable networks capable of facilitating the exchange of information and/or data of the medical imaging system 100. In some embodiments, at least one assembly of the medical imaging system 100 (e.g., the medical device 110, the terminal device 130, the processing device 140, and the storage device 150) may exchange information and/or data with at least one other assembly of the medical imaging system 100 via the network 120. For example, the processing device 140 may obtain the image data of the target object from the image obtaining device of the medical device 110 via the network 120. The network 120 may include a public network (e.g., the Internet), a private network (e.g., a local area network (LAN)), a wired network, a wireless network (e.g., an 802.11 network, a Wi-Fi network), a frame relay network, a virtual private network (VPN), a satellite network, a telephone network, a router, a hub, a switch, or the like, or any combination thereof. For example, the network 120 may include a wired network, an optical fiber network, a telecommunications network, an intranet, a wireless local area network (WLAN), a metropolitan area network (MAN), a public switched telephone network (PSTN), a Bluetooth™ network, a ZigBee™ network, a Near-Field Communication (NFC) network, or the like, or any combination thereof. In some embodiments, the network 120 may include at least one network access point. For example, the network 120 may include wired and/or wireless network access points, such as base stations and/or Internet exchange points, and at least one assembly of the medical imaging system 100 may be connected to the network 120 through the access points to exchange data and/or information.

The terminal device 130 may communicate and/or connect with the medical device 110, the processing device 140, and/or the storage device 150. For example, a user may interact with the medical device 110 through the terminal device 130 to control one or more assemblies of the medical device 110. In some embodiments, the terminal device 130 may include a terminal device 130-1, a tablet computer 130-2, a laptop computer 130-3, or the like, or any combination thereof. For example, the terminal device 130-1 may include a mobile control handle, a personal digital assistant (PDA), a smart phone, or the like, or any combination thereof. In some embodiments, the user may interact with the processing device 140 through the terminal device 130, so as to issue instructions to the data processing process. For example, the user may specify one or more data processing models (e.g., a reference data processing model), so that the processing device 140 may select a target data processing model from the data processing models.

In some embodiments, the terminal device 130 may include an input device, an output device, or the like. Input manners may include keyboard input, touch screen (e.g., with tactile or tactile feedback) input, voice input, eye tracking input, gesture tracking input, brain monitoring system input, image input, video input, or any other similar input mechanism. The input information received through the input device may be transmitted to the processing device 140 via, for example, a bus, for further processing. Other types of input devices may include cursor control devices, such as a mouse, trackball, or cursor direction keys. In some embodiments, an operator (e.g., a medical staff) may input instructions reflecting the medical image category of the target object through the input device. The output device may include a display, a loudspeaker, a printer, or the like, or any combination thereof. The output device may be used to output images taken by the image obtaining device, and/or medical images scanned by the medical device 110, and/or images determined by the processing device 140, or the like. In some embodiments, the terminal device 130 may be part of the processing device 140.

The processing device 140 may process data and/or information obtained from the medical device 110, the at least one terminal device 130, the storage device 150, or other assemblies of the medical imaging system 100. For example, the processing device 140 may obtain medical image data of the target object from the medical device 110. As another example, the processing device 140 may obtain a captured image of the target object from the image obtaining device, and perform analysis and processing on the captured image of the target object. In some embodiments, the processing device 140 may be used to determine a target data processing model. The target data processing model may be a model used for medical data collection, data correction, image reconstruction, image post-processing, diagnostic analysis, or the like. For example, the processing device 140 may use an evaluation model to score a plurality of candidate data processing models, and based on the score, select the target data processing model from the plurality of candidate data processing models.

In some embodiments, the processing device 140 may be a single server or a server group. The server group may be centralized or distributed. In some embodiments, the processing device 140 may be local or remote. For example, the processing device 140 may access information and/or data from the medical device 110, the at least one terminal device 130, and/or the storage device 150 via the network 120. As another example, the processing device 140 may be directly connected to the medical device 110, the at least one terminal device 130, and/or the storage device 150 to access information and/or data. In some embodiments, the processing device 140 may be implemented on a cloud platform. For example, the cloud platform may include a private cloud, a public cloud, a hybrid cloud, a community cloud, a distributed cloud, an inter-cloud cloud, a multi-cloud, or the like, or any combination thereof.

In some embodiments, the processing device 140 may include one or more processors (e.g., a single-chip processor or a multi-chip processor). Merely as an example, the processing device 140 may include a central processing unit (CPU), an application-specific integrated circuit (ASIC), an application-specific instruction set processor (ASIP), an image processing unit (GPU), a physical operation processing unit (PPU), a digital signal processor (DSP), a Field Programmable Gate Array (FPGA), a Programmable Logic Device (PLD), a controller, a microcontroller unit, a Reduced Instruction Set Computer (RISC), a microprocessor, or the like, or any combination thereof. In some embodiments, the processing device 140 may be a part of the medical device 110 or the terminal device 130. For example, the processing device 140 may be integrated into the medical device 110 to process a first image of the target object and a second image including a partial area of the target object to locate the target object.

The storage device 150 may store data, instructions, and/or any other information. For example, the storage device 150 may store medical image data of the target object obtained by the medical device 110, an image taken by the image obtaining device, or the like. In some embodiments, the storage device 150 may store data obtained from the medical device 110, the at least one terminal device 130, and/or the processing device 140. For example, the storage device 150 may store the target data processing model selected by the processing device 140. In some embodiments, the storage device 150 may store data and/or instructions used by the processing device 140 to execute or use to complete the exemplary methods described in the present disclosure. In some embodiments, the storage device 150 may include mass storage, removable storage, volatile read-write storage, read-only storage (ROM), or the like, or any combination thereof. In some embodiments, the storage device 150 may be implemented on the cloud platform.

In some embodiments, the storage device 150 may be connected to the network 120 to communicate with at least one other assembly (e.g., the medical device 110, the at least one terminal device 130, and the processing device 140) in the medical imaging system 100. At least one assembly in the medical imaging system 100 may access data stored in the storage device 150 (e.g., the first image/second image of the target object, medical image data of the target object, etc.) via the network 120. In some embodiments, the storage device 150 may be part of the processing device 140.

It should be noted that the descriptions mentioned above are only for illustrative purposes, which is not intended to limit the scope of the present disclosure. For those ordinary skilled in the art, various changes and modifications may be made under the guidance of the content of the present disclosure. The features, structures, methods, and other features of the exemplary embodiments described in the present disclosure may be combined in various ways to obtain additional and/or alternative exemplary embodiments. For example, the storage device 150 may be a data storage device including a cloud computing platform (e.g., a public cloud, a private cloud, a community cloud, a hybrid cloud, etc.). However, these changes and modifications may not depart from the scope of the present disclosure.

In some embodiments, when using the same processing data model to process different data, the specificity of the data may be relatively large, which may lead to insufficient accuracy of the obtained results. For example, in the field of medical imaging, even if the scan parameters are the same when reconstructing images, if the body type of a patient is very different, or the reconstruction parameters are very different, some of the results of reconstructing an image with the same data processing model may not be accurate enough. If the result of the reconstructed image is inaccurate, it may be likely to have a greater impact on subsequent diagnosis and treatment. As another example, for images that need to be corrected for motion artifacts, factors such as different motion parts, motion manners and degrees may also cause some corrected images obtained with the same data processing model to be inaccurate.

FIG. 2 is a schematic diagram illustrating exemplary hardware and/or software components of an exemplary computing device 200 on which the processing device 140 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (e.g., program code) and perform functions of the processing device 140 in accordance with the techniques described herein. The computer instructions may include, for example, routines, programs, objects, components, data structures, procedures, modules, and functions, which perform particular functions described herein. For example, the processor 210 may process image data obtained from the imaging device 110, the terminals 130, the storage device 150, and/or any other component of the imaging system 100. In some embodiments, the processor 210 may include one or more hardware processors, such as a microcontroller, a microprocessor, a reduced instruction set computer (RISC), an application-specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, and thus operations and/or method operations that are performed by one processor as described in the present disclosure may also be jointly or separately performed by the multiple processors. For example, if in the present disclosure the processor of the computing device 200 executes both operations A and operation B, it should be understood that operation A and operation B may also be performed by two or more different processors jointly or separately in the computing device 200 (e.g., a first processor executes operation A and a second processor executes operation B, or the first and second processors jointly execute operation s A and B).

The storage 220 may store data/information obtained from the imaging device 110, the terminals 130, the storage device 150, and/or any other component of the imaging system 100. In some embodiments, the storage 220 may include a mass storage, a removable storage, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing device 140 for determining the position of a target region of a subject (e.g., a target portion of a patient).

The I/O 230 may input and/or output signals, data, information, etc. In some embodiments, the I/O 230 may enable a user interaction with the processing device 140. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 120) to facilitate data communications. The communication port 240 may establish connections between the processing device 140 and the imaging device 110, the terminals 130, and/or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee™ link, a mobile network link (e.g., 3G, 4G, 5G), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
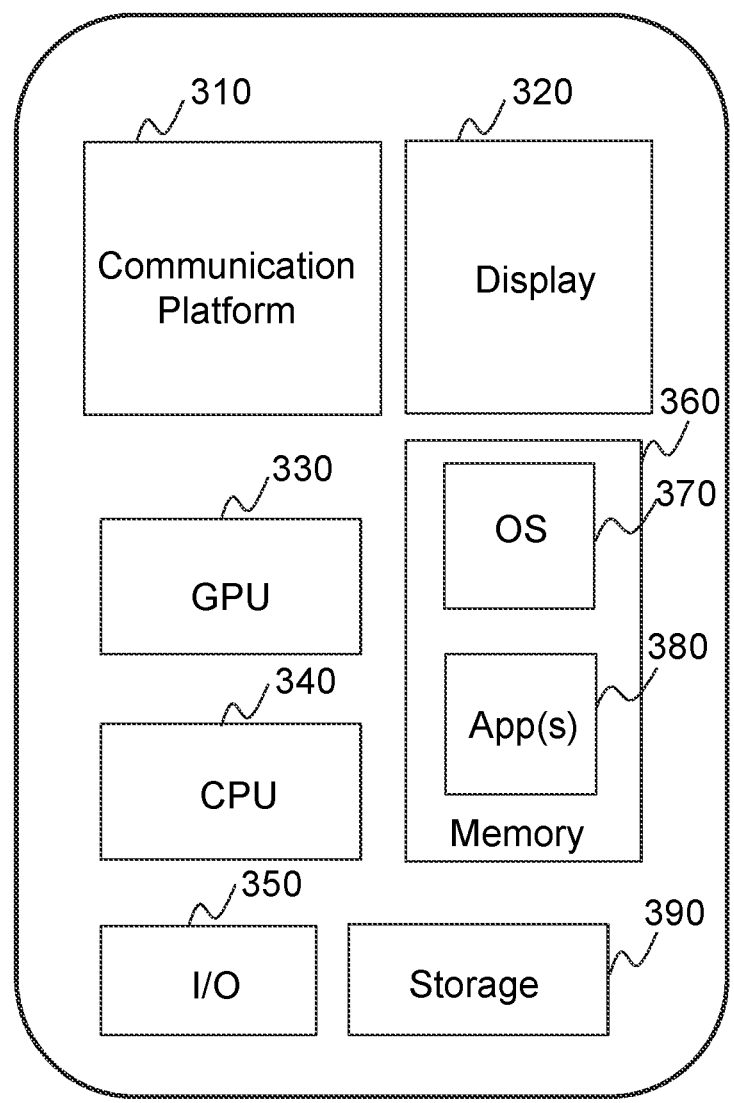
FIG. 3 is a schematic diagram illustrating exemplary hardware and/or software components of an exemplary terminal device according to some embodiments of the present disclosure.

FIG. 3 is a schematic diagram illustrating exemplary hardware and/or software components of an exemplary terminal device 300 on which the terminals 130 may be implemented according to some embodiments of the present disclosure. As illustrated in FIG. 3, the terminal device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the terminal device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to image processing or other information from the processing device 140. User interactions with the information stream may be achieved via the I/O 350 and provided to the processing device 140 and/or other components of the imaging system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other types of workstation or terminal device. A computer may also act as a server if appropriately programmed.

Some embodiments of the present disclosure provide a method for determining a target data processing model. The data to be processed may be used to estimate the suitability of using different candidate data processing models to process the data, so as to select a target data processing model for processing the data from the candidate data processing models. In this way, the specificity of the data to be processed is considered and thus the data processing result obtained using the target data processing model may be more accurate.

Figure 4:
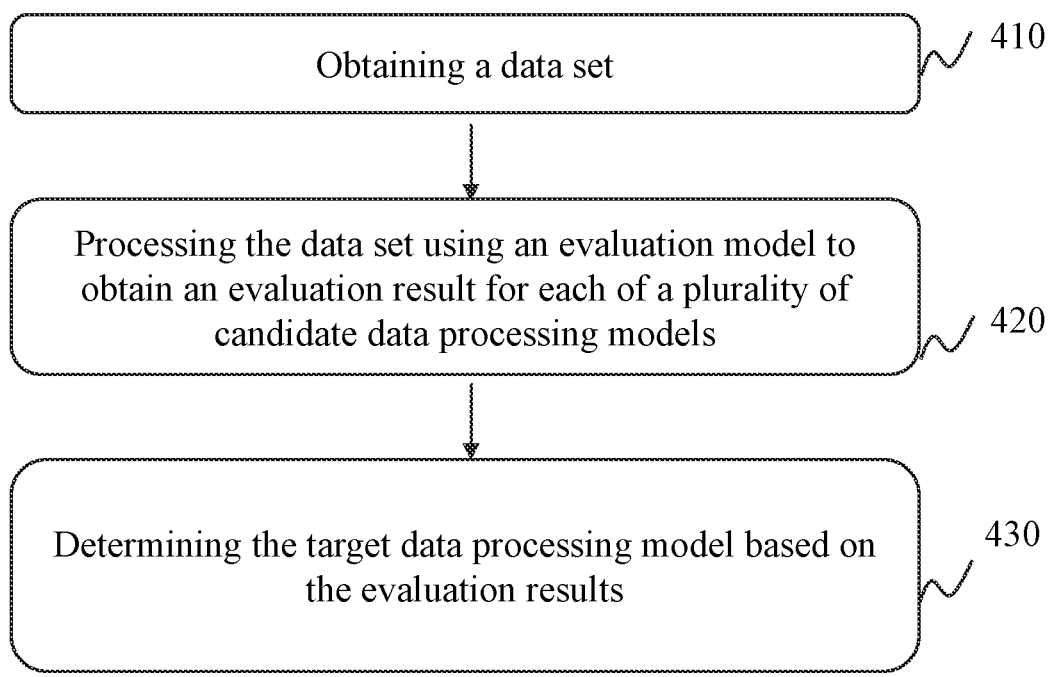
FIG. 4 is an exemplary flowchart of a method for determining a target data processing model according to some embodiments of the present disclosure.

FIG. 4 is an exemplary flowchart of a method for determining a target data processing model according to some embodiments of the present disclosure.

Specifically, a method 400 for determining a target data processing model may be executed by a processor, such as the processing device 140 in the medical imaging system 100. For example, the method 400 for determining a target data processing model may be stored in a storage device (such as the storage device 150) in the form of a program or instruction. When the medical imaging system 100 (such as the processing device 140) executes the program or instruction, the method 400 for determining a target data processing model may be realized. In some embodiments, the method 400 for determining a target data processing model may be executed by a system 800 for determining a target data processing model.

In operation 410, a data set may be obtained. In some embodiments, Operation 410 may be performed by an obtaining module 810.

In some embodiments, the data set may include data that needs to be processed by the selected target data processing model. The data may include, but is not limited to, data in the form of texts, images, sound, videos, or the like. For example, the data set may include scan data obtained by the medical device (e.g., the medical device 110), set reconstruction parameters, or the like, and the target data processing model may process the data set to obtain a reconstructed image. As another example, the data set may include an image with motion artifacts, and the target data processing model may perform motion artifact correction based on the image to obtain a corrected image. In some embodiments, the obtaining module 810 may obtain the data set from a storage device (e.g., the storage device 150).

In operation 420, an evaluation model may be used to process the data set to obtain an evaluation result of each candidate data processing model among the plurality of candidate data processing models. In some embodiments, operation 420 may be performed by the evaluation module 820.

In some embodiments, the candidate data processing models may include models based on various algorithms. For example, in the field of CT image reconstruction, the candidate data processing models may be models based on algorithms such as iterative reconstruction algorithms, direct back-projection algorithms, filtered back-projection algorithms, or the like. In some embodiments, the candidate data processing models may also include trained machine learning models. Different candidate data processing models may have different network structures, and may also have different model parameters. For example, in the field of motion artifact correction, the candidate data processing models may include but are not limited to a U-NET model, a convolutional neural network model, or the like. The candidate data processing models with different model parameters may be trained machine learning models obtained based on different training sets. The different training sets may have larger data differences. For example, if the candidate data processing models are used for motion artifact correction, training samples in a first training set may involve breathing movements in the chest and abdomen, and training samples in a second training set may involve heartbeats in the chest. When correcting artifacts caused by the breathing motion, the effect of using a trained first machine learning model based on the first training set may be better than that of using a trained second machine learning model based on the second training set.

In some embodiments, the evaluation model may be a trained machine learning model. For example, the evaluation model may include, but is not limited to, a logistic regression model, a support vector machine model, a Bayesian model, a K-nearest neighbor model, a decision tree model, a random forest model, a gradient boosting model, or the like. As another example, the evaluation model may include a deep learning model, such as a neural network, a deep neural network, a recursive neural network, a recurrent neural network, a convolutional network, or the like, or a combination thereof. The data set mentioned above may be input into the evaluation model, so as to obtain the evaluation result of each candidate data processing model among the plurality of candidate data processing models. The evaluation result may indicate the suitability of the corresponding candidate data processing model for processing the current data set. For example, the evaluation result may be in the form of a score. Merely as an example, the score may be 0 or 1. 1 may indicate that the corresponding candidate data processing model is suitable for processing the current data set, and 0 may indicate that the corresponding candidate data processing model is not suitable for processing the current data set. As another example, the score may be a value between 0-1, such as 0.2, 0.5, 0.7, or the like. An exemplary process of obtaining the evaluation model may be seen in FIG. 7.

In operation 430, based on the evaluation result, the target data processing model may be selected from the plurality of candidate data processing models. In some embodiments, operation 430 may be performed by a selection module 830.

In some embodiments, the selection module 830 may designate the candidate data processing model corresponding to the highest score as the target data processing model. In some embodiments, the selection module 830 may firstly select one or more reference data processing models from the plurality of candidate data processing models, and then select the target data processing model from the reference data processing models based on the corresponding scores of the reference data processing models. For example, the reference data processing models may be automatically determined by the selection module 830 based on characteristic data in the data set, and the details may be seen in FIG. 5. As another example, the reference data processing models may be determined by the selection module 830 based on user input. For more details, please refer to FIG. 6. After the target data processing model is selected, the processor may use the target data processing model to process the data to be processed to obtain the data processing result.

In some embodiments, the evaluation model may be trained after the reference data processing models are determined. The processing device 140 may determine a plurality of selected training samples based on the reference data processing models and then use the plurality of selected training samples to train the evaluation model. For instance, there may be plenty of training samples corresponding to various candidate data processing models. The processing device 140 may determine the training samples related to at least one of the reference data processing models as the selected training samples. In this way, the evaluation model is specifically trained using training samples corresponding to the reference data processing models.

Alternatively, the evaluation model may be trained using the plurality of training samples corresponding to various candidate data processing models. In this way, the evaluation model may be trained in advance, and thus the efficiency of determining the target processing model may be improved. For example, the evaluation model may output scores for the plurality of candidate data processing models. The processing device 140 may compare only the scores corresponding to the reference data processing models and select the target processing model from the reference data processing models based on the scores.

The target data processing model may be used to process the data set to obtain a data processing result. This operation may be performed by the processing device 140 or an external processing device. In some embodiments, the processing device 140 may direct a terminal device (e.g., terminal device 130) to present the data processing result to a user. The user may view the data processing result via the terminal device. In some embodiments, the user may determine whether the data processing result is satisfactory or not. For example, when the target data processing model is used to eliminate or reduce artifacts in a medical image, the data processing result may be a processed image. If the artifacts in the processed image have been eliminated or reduced to an acceptable degree, the user may determine that the data processing result is satisfying. If the processed image still includes non-neglectable artifacts, subsequent diagnosis or analysis based on the processed image may be affected, and the user may determine that the data processing result is unsatisfactory. In some embodiments, in response to obtaining a user input indicating that the data processing result is unsatisfactory, the processing device 140 may determine, from the plurality of candidate data processing models, a replacing target data processing model that is different from the target data processing model. Merely by way of example, the target data processing model may correspond to the highest score. The processing device 140 may designate a candidate data processing model corresponding to the second-highest score as the replacing target data processing model. In some embodiments, the processing device 140 may further process the data set using a to obtain a replacing data processing result. The processing device 140 may also cause the terminal device to present the replacing data processing result to the user.

In some embodiments, for each operation of the entire workflow of the data processing process, operations 410-430 may be repeated, to select a suitable target data processing model for each operation according to the data to be processed in each operation. For example, the medical imaging process may involve medical data acquisition, medical data correction, medical image generation (or reconstruction), motion artifact correction for a medical image, metal artifact correction for a medical image, scatter correction for a medical image, medical image segmentation, image post-processing, diagnosis analysis, and other operations. The data to be processed in each operation may be different, and the required target data processing model may also be different. In some embodiments, the evaluation model used in each operation may also be different. A plurality of training samples may be obtained for each operation to train the evaluation model corresponding to the operation. By repeating operations 410-430 for each operation to select the target data processing model, the accuracy of the results obtained in each operation may be improved, thereby improving the accuracy of the final results of the entire workflow (such as diagnostic analysis results).

Figure 5:
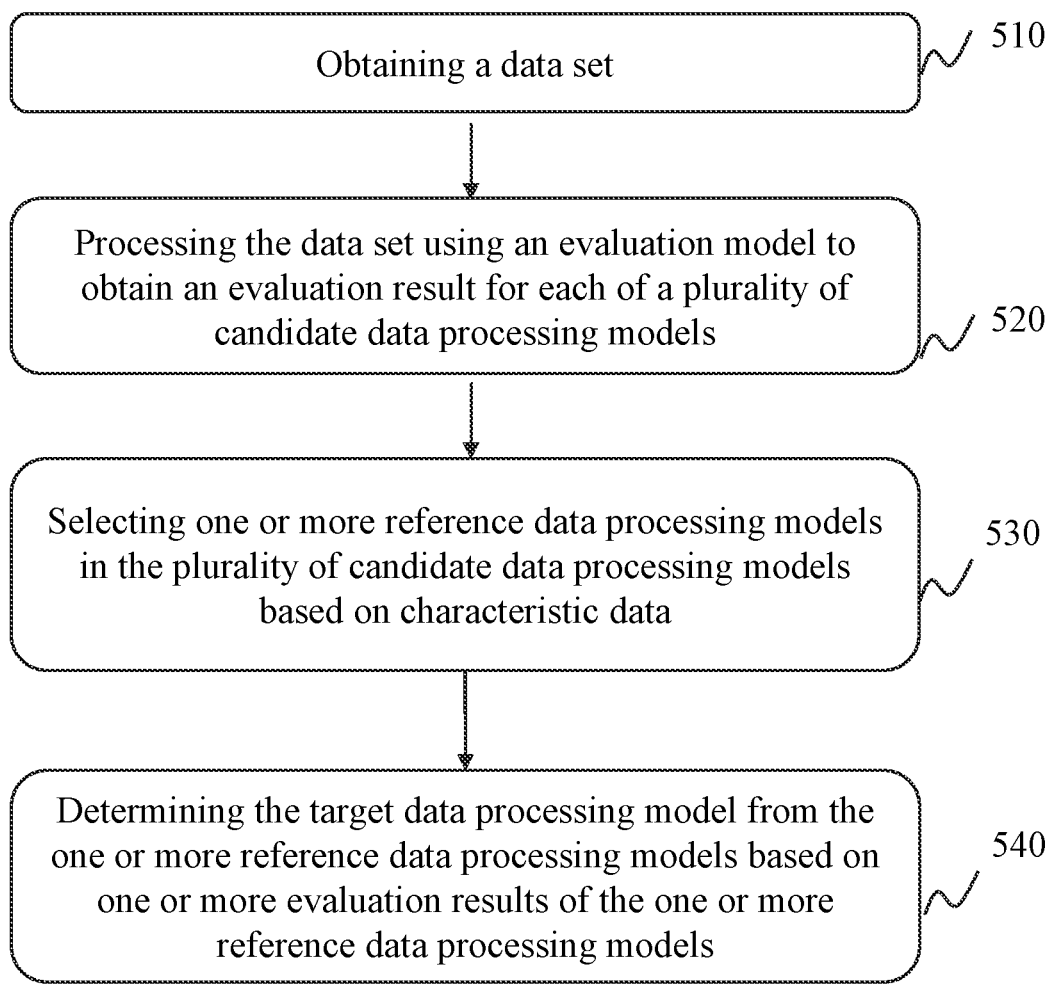
FIG. 5 is a flowchart illustrating an exemplary method for determining a target data processing model according to some embodiments of the present disclosure.

FIG. 5 is a flowchart illustrating an exemplary method for determining a target data processing model according to some embodiments of the present disclosure.

Specifically, method 500 for selecting the data processing model may be executed by a processor, such as processing device 140 in a medical imaging system 100. For example, the method 500 for selecting the data processing model may be stored in a storage device (e.g., storage device 150) in the form of a program or instruction, and when the medical imaging system 100 (such as processing device 140) executes the program or instruction, the method 500 for selecting the data processing model may be realized. In some embodiments, the method 500 for selecting the data processing model may be performed by a system 800 for selecting the data processing model.

In operation 510, a data set may be obtained. In some embodiments, operation 510 may be executed by an obtaining module 810.

In operation 520, an evaluation result of each candidate data processing model in a plurality of candidate data processing models may be obtained by processing the data set based on an evaluation model. In some embodiments, operation 520 may be executed by an evaluation module 820. In some embodiments, operations 510 and 520 may be executed in a manner similar to operations 410 and 420.

In operation 530, one or more reference data processing models in the plurality of candidate data processing models may be selected based on characteristic data. In some embodiments, operation 530 may be executed by the selection module 830.

In some embodiments, the characteristic data may be selected from data to be processed by a target data processing model. The value or the data range of the characteristic data may be known and may have a large impact on the target data processing model. Therefore, based on the characteristic data, the scope of the candidate data processing models may be narrowed according to a preset condition. One or more reference data processing models may be determined according to the characteristic data, and then the target data processing model may be selected from the one or more reference data processing models. In some embodiments, the target data processing model may be used in medical imaging techniques, such as medical data acquisition, medical imaging scans, medical image reconstruction, medical image segmentation, etc. In the field of medical imaging, the characteristic data may include, but may be not limited to, scan parameters of medical imaging devices, image reconstruction parameters, region of interest of a subject in medical imaging, or characteristic information of a subject in medical imaging, or the like, or any combination thereof. For example, the scanning parameters may include a speed, a scanning method, a pitch, a tube current, a tube voltage, a scan length, a scanning portion, with or without a contrast agent, or the like, or any combination thereof. The image reconstruction parameters may include reconstruction algorithms, reconstructing layer thick, a reconstruction FoV, a size of reconstruction matrix, or any combination thereof. The region of interest may be a part or a portion of a part to be scanned, which may include but not limited to, the head, the chest, the abdomen, the hip, a leg, an arm, or the like. As another example, the characteristic information of a subject in medical imaging may include a body of the subject, motion information during imaging, the concentration of the contrast agent, implants, or the like. The motion information during imaging may include related information of physiological motion, such as respiratory movement, heartbeat movement, gastrointestinal peristalsis, or the like. In some embodiments, the characteristic data may include different types of data in different links. For example, for image segmentation, the characteristic data may include a region of interest and characteristic information of the subject in medical imaging. For example, for a link of image reconstruction, the characteristic data may include scan parameters, image reconstruction parameters, the region of interest of the subject in medical imaging, or the characteristic information of the subject in medical imaging.

In some embodiments, the candidate data processing model may have a label corresponding to the characteristic data. The selection module 830 may select a reference data processing model based on the label corresponding to the characteristic data. For example, data processing model A is more suitable for the segmentation of a region of the head, and a corresponding label may be set as "head"; data processing model B is more suitable for the segmentation of a region of the abdomen, and a corresponding label may be set as "abdomen". Assuming that the region of interest is the head, the selection module 830 may select the candidate data processing model A labeled as "head" as one of the reference data processing models.

In some embodiments, the data to be processed may include some other data having a significant impact on selecting the target data processing model besides the characteristic data. For example, for motion artifact correction, different motion parts, motion mode, or motion extent may result in different artifacts on the image, thereby may affect the correction result. For such cases, the target data processing model may be further selected from the reference data processing model by operation 540. In such a way, specificities of various types of data may be considered comprehensively, and a data processing model more suitable for processing the data may be selected.

In operation 540, the target data processing model may be selected from one or more reference data processing models based on one or more evaluation results of the one or more reference data processing models. In some embodiments, operation 530 may be executed by the selection module 830.

In some embodiments, the evaluation result may be a score, and the selection module 830 can specify a reference data processing model corresponding to the highest score as the target data processing model. In some embodiments, the selection module 830 may compare the highest score of the reference data processing model with a preset score threshold. If the highest score is greater than or equal to the preset score threshold, the reference data processing model corresponding to the highest score may be specified as the target data processing model. If the highest score is smaller than the preset score threshold, the reference data processing model corresponding to the highest score may not be suitable for processing the data to be processed, and the scope of the reference data processing model or scope of the candidate data processing model may be re-determined.

It should be noted that the above description of the method 300 may be only a specific example, and should not be regarded as the only feasible implementation solution. For those skilled in the art, it is possible to make various modifications and changes for the method 300 under the guidance of the present disclosure, but these modifications and changes are still within the scope described above. For example, operation 530 may be replaced by selecting one or more reference data processing models from the plurality of candidate data processing models based on a user input.

Figure 6:
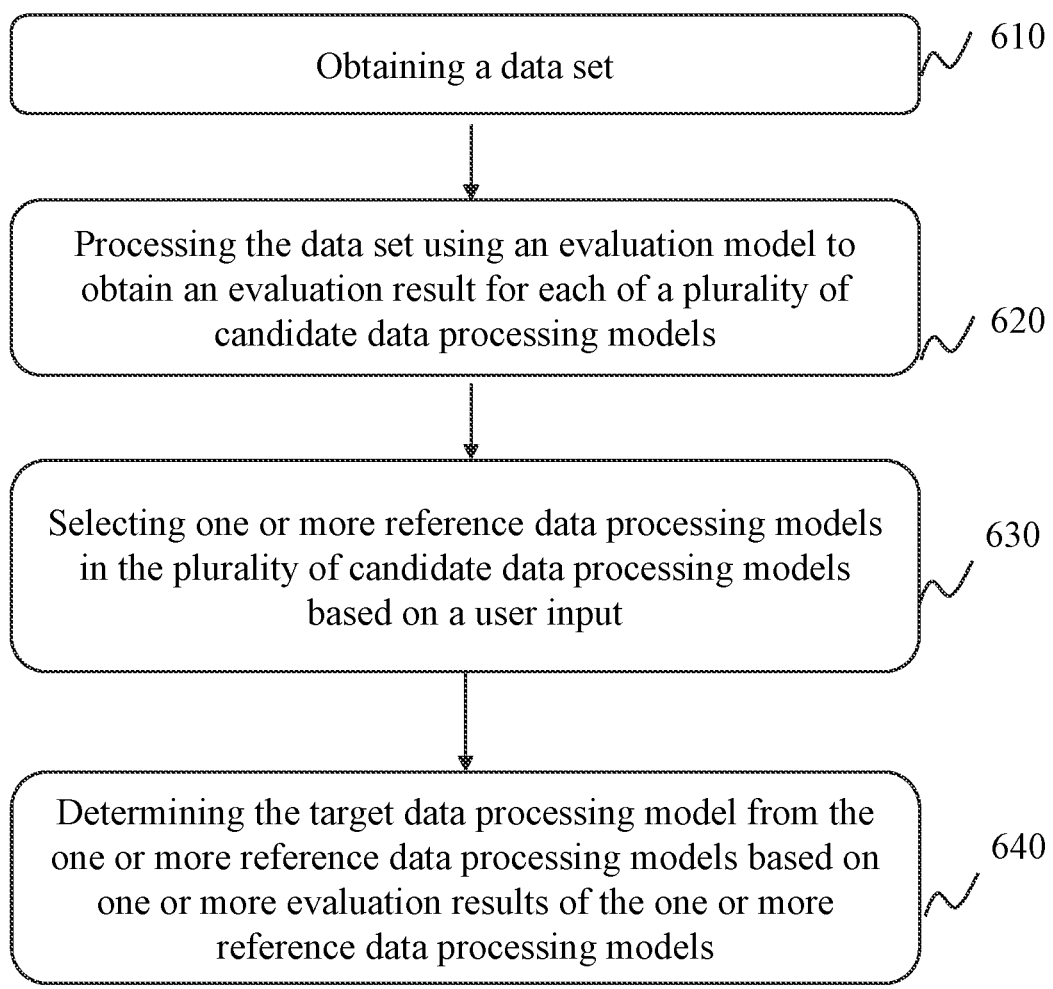
FIG. 6 is a flowchart illustrating an exemplary method for determining a target data processing model according to some embodiments of the present disclosure.

FIG. 6 is a flowchart illustrating an exemplary method for determining a target data processing model according to some embodiments of the present disclosure.

Specifically, method 600 for selecting the data processing model may be executed by a processor, such as a processing device 140 in the medical imaging system 100. For example, the method 600 for selecting the data processing model may be stored in a storage device (e.g., a storage device 150) in the form of a program or instruction, and when the medical imaging system 100 (such as processing device 140) executes the program or instruction, the method 600 for selecting the data processing model may be realized. In some embodiments, the method 600 for selecting the data processing model may be performed by a system 800 for selecting the data processing model.

In operation 610, a data set may be obtained. In some embodiments, operation 610 may be executed by the obtaining module 810.

In operation 620, an evaluation result of each candidate data processing model in a plurality of candidate data processing models may be obtained by processing the data set based on an evaluation model. In some embodiments, operation 620 may be executed by the evaluation module 820. In some embodiments, operations 610 and 620 may be executed in a manner similar to operations 410 and 420.

In operation 630, one or more reference data processing models may be selected from a plurality of candidate data processing models based on a user input. In some embodiments, operation 630 may be executed by the selection module 830.

In some embodiments, the user may input data and/or instructions via a terminal device (e.g., a terminal device 130). Method of input may include a keyboard input, a touch screen (e.g., a screen having a haptics or haptic feedback) input, voice input, eye tracking input, gesture tracking input, brain monitoring system input, image input, video input, or any other similar input mechanism. In some embodiments, the user may determine the reference data processing model (s) based on the characteristic data mentioned in operation 530. For example, for CT image reconstruction algorithm, the characteristic data may include scan parameters. The scan parameters may include, but may be not limited to, speed, a scanning method, a pitch, a tube current, a tube voltage, a scan length, a scanning portion, with or without a contrast agent, or the like. For example, the user may select a scope of the reference data processing model(s) based on parallel beam imaging or sector beam imaging used by a CT scanner, and may input the scope of the reference data processing model(s) into the terminal device. The selection module 830 may determine one or more reference data processing models according to the user input. For example, the selection module 830 may present the reference data processing model(s) automatically selected based on the characteristic data to the user via the terminal device, and the user may further confirm or modify. Based on the user input, the selection module 830 may determine the reference data processing model(s) confirmed by the user.

In operation 640, a target data processing model may be selected from one or more reference data processing models based on the evaluation result of one or more reference data processing models. In some embodiments, operation 630 can be executed by the selection module 830. In some embodiments, operation 640 may be executed in a manner similar to operation 540.

It should be noted that the above description of the method 400 may be only a specific example, and should not be regarded as the only feasible implementation solution. For those skilled in the art, it is possible to make various modifications and changes for the method 600 under the guidance of the present disclosure, but these modifications and changes are still within the scope described above. For example, operation 630 may be replaced with characteristic data, and one or more reference data processing models may be selected from a plurality of candidate data processing models.

FIG. 7 is a flowchart illustrating an exemplary method for training an evaluation model according to some embodiments of the present disclosure.

Specifically, the method 700 for determining a target data processing model may be executed by a processor, such as a processing device 140 in the medical imaging system 100. For example, the method 700 for selecting the data processing model may be stored in a storage device (e.g., a storage device 150) in the form of a program or instruction, and when the medical imaging system 100 (such as processing device 140) executes the program or instruction, the method 700 for selecting the data processing model may be realized. In some embodiments, the method 700 for selecting the data processing model may be performed by a system 800 for selecting the data processing model.

In operation 710, a plurality of training samples may be obtained. In some embodiments, operation 710 may be executed by the obtaining module 810.

In some embodiments, each training sample in the plurality of training samples may include a sample data set and a sample evaluation result of at least one candidate data processing model in a plurality of candidate data processing models. As an example, the sample evaluation result may be a sample score, and the sample score may be 0 or 1, or it may be a value between 0-1. The sample score may be determined based on a result of processing the sample data set based on the corresponding candidate data processing model. For example, for a sample data set, the sample data set may be processed using one or more candidate data processing models in the plurality of candidate data processing models, and a plurality of processing results may be obtained. The plurality of processing results may be compared automatically by a processor or compared by the user, and thus the sample score(s) of the one or more candidate data processing models corresponding to the sample data set may be obtained. For example, for motion artifact correction, the processing result is a corrected image, the user may compare the corrected image artificially, and the sample score corresponding to each candidate data processing model may be determined according to the outcome of the correction.

In operation 720, a trained evaluation model may be obtained by training an initial evaluation model based on the plurality of training samples. In some embodiments, operation 720 may be executed by the evaluation module 820. In some embodiments, operations 710 and operation 720 may be implemented by an external device, and the external device may send a well-trained evaluation model to a system 800 for determining a target data processing model.

In some embodiments, parameters of the evaluation model may be continuously updated by training the initial evaluation model with the training samples. For example, training methods may include but may be not limited to, a gradient decrease method, a Bayesian method, a sequence minimum optimization method, or the like. In some embodiments, the training may end when the evaluation model after training meets a preset condition. The preset condition may be that a result of the loss function reaches convergence or is smaller than a preset threshold.

It should be noted that the above description of the method 700 may be only a specific example, and should not be regarded as the only feasible implementation solution. For those skilled in the art, it is possible to make various modifications and changes for the method 700 under guidance of the present disclosure, but these modifications and changes are still within the scope described above.

Figure 8:
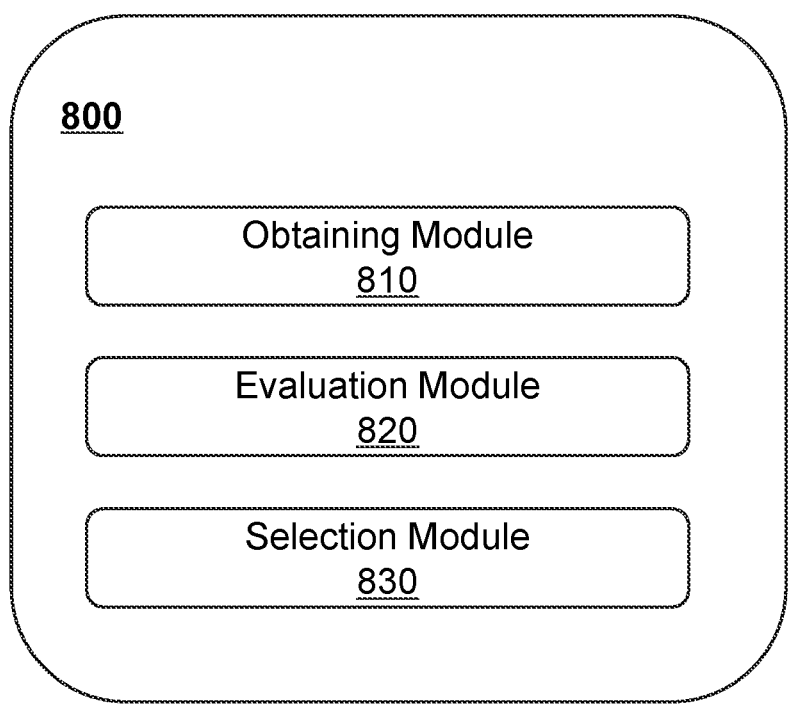
FIG. 8 is a module diagram illustrating an exemplary system for selecting a target data processing model according to some embodiments of the present disclosure.

FIG. 8 is a module diagram illustrating an exemplary system for selecting a target data processing model according to some embodiments of the present disclosure.

As shown in FIG. 8, a system 800 for selecting the target data processing model may include an obtaining module 810, an evaluation module 820, and a selection module 830. In some embodiments, the system 800 may be implemented by a processing device, such as a processing device 140 of the medical imaging system 100 shown in FIG. 1.

The obtaining module 810 may be used to obtain a data set. In some embodiments, the data set may include data to be processed by a selected target data processing model. The data may include but may be not limited to, words, images, sounds, or video, or the like. For example, the data set may include scan data obtained by a medical device (e.g., a medical device 110), well-set reconstruction parameters, or the like, and the target data processing model may process the data set to obtain an image after reconstruction. As another example, the data set may include an image, and the target data processing model may divide the region of interest (ROI) based on the image. In some embodiments, the obtaining module 810 may obtain the data set from a storage device (e.g., a storage device 150).

In some embodiments, the obtaining module 810 may be used to obtain a plurality of training samples for training an evaluation model. Each training sample in the plurality of training samples may include a sample data set and a label. The label may be a sample evaluation result (such as a sample score) of one or more candidate data processing models in the plurality of candidate data processing models. As an example, the sample score may be 0 or 1, or a value between 0-1. The sample score may be determined based on a result of processing the sample data set based on the corresponding candidate data processing model. For example, for a sample data set, the sample data set may be processed based on one or more candidate data processing models in the plurality of candidate data processing models, and a plurality of processing results may be obtained. The plurality of processing results may be compared automatically by a processor or compared by the user, thereby the sample score of the one or more candidate data processing models corresponding to the sample data set may be obtained. For example, for motion artifact correction, the processing result is a corrected image, the user may compare the corrected image artificially, and the sample score corresponding to each candidate data processing model may be determined according to the effect of correction.

The evaluation module 820 may be used to process the data set by the evaluation model to obtain a score of each candidate data processing model in the plurality of candidate data processing models. In some embodiments, the evaluation model may be a machine learning model after training. For example, the evaluation model may include, but may be not limited to, logistic regression model, support vector machine model, Bayesian model, K-nearest neighbor model, decision tree model, random forest model, or gradient Boosting model, or the like. The data set may be input into the evaluation model to obtain the score of each candidate data processing model in the plurality of candidate data processing models. The score may represent a degree of suitability of the corresponding candidate data processing model for processing the current data set. For example, the score may be 0 or 1, 1 may represent that the corresponding candidate data processing model is suitable for processing the current data set, 0 may represent that the corresponding candidate data processing model is not suitable for processing the current data set. As another example, the score may be a value between 0-1, such as 0.2, 0.5, 0.7, or the like.

In some embodiments, the evaluation module 820 may be used for training the evaluation model. Specifically, the evaluation module 820 may train an initial evaluation model based on a plurality of training samples to obtain a trained evaluation model. [0075] In some embodiments, parameters of the evaluation model may be continuously updated by training the initial evaluation model with inputting the training samples. For example, training methods may include but may be not limited to, gradient decrease, Bayesian, sequence minimum optimization, or the like. In some embodiments, the training may end when the evaluation model after training meets a preset condition. The preset condition may be that result of the loss function is convergence or smaller than a preset threshold.

The selection module 830 may be used to select a target data processing model from a plurality of candidate data processing models based on a score of the plurality of candidate data processing models. In some embodiments, the selection module 830 may specify a candidate data processing model corresponding to the highest score as a target data processing model. In some embodiments, the selection module 830 can further select one or more reference data processing models from the plurality of candidate data processing models and select the target from the reference data processing model(s) based on the corresponding score of the reference data processing model(s). For example, the reference data processing model(s) may be determined by the selection module 830 based on characteristic data in the data set. As another example, the reference data processing model(s) may be determined by the selection module 830 based on user input. After the target data processing model is selected, the processor may process the model based on target data and process data to be processed, then obtain a result of processing data.

In some embodiments, for each link of processing data, operations 410-430 may be repeated to select a suitable target data processing model according to data to be processed of each link. For example, a process of medical imaging may involve data obtaining, data correction, image generation (or reconstruction), image post-processing, diagnostic analysis, or the like. Data that need to be processed may be different in each link, and the target data processing model also may be different. In some embodiments, the evaluation model used in each link may also be different. A plurality of training samples corresponding to each link may be obtained to train the evaluation model. By repeating operations 410-430 for each link, the target data processing model may be determined, and the accuracy of the result of each link may be improved, and accuracy of the final result of the entire workflow (e.g., a result of diagnostic analysis) may be improved.

It should be understood that the system and its modules shown in FIG. 8 may be implemented in various ways. In some embodiments, the system 800 and its modules may be implemented by a hardware, a software, or a combination thereof. As used herein, the hardware may be implemented using dedicated logic, and the software may be stored in a storage and be implemented by an appropriate instruction executing system (e.g., a microprocessor, a dedicated design hardware). It will be appreciated by those skilled in the art that the above methods and systems may be implemented by computer-executable instructions and/or embedding in control codes of a processor. For example, the control codes may be provided by a medium, for example, a disk, a CD or a DVD-ROM, a programmable memory device such as a read-only memory (e.g., firmware), or a data carrier such as an optical or electric signal carrier. The systems and the modules in the present disclosure may be implemented not only by an ultra large scale integrated circuit, a gated array, a semiconductor such as a logic chip or a transistor, a hardware circuit of a programmable hardware device such as a field programmable gate array or a programmable logic device, but also by software executed by various processors, and further also by a combination of the hardware and the software above (e.g., a firmware).

It should be noted that the above description of the system 800 and its modules are only for the convenience of description, and the present disclosure cannot be limited to the scope of the illustrated embodiment. For persons having ordinary skills in the art, after understanding the principle of the system, modules may be combined in various ways or constitute a sub-system to connected to other modules without departing from the principle. In some embodiments, the evaluation module 820 and the selection module 830 may be different modules in a system or be one module that implements functions of two or two more modules of the above modules. In some embodiments, the evaluation module 820 and the selection module 830 may share a single storage module, each module may also have its own storage module. All such modifications are within the protection scope of the present disclosure.

The possible benefits of embodiments of the present disclosure may include but are not limited to: (1) a target data processing model for processing data may be efficiently determined by the machine learning model; (2) a target data processing model to be more suitable for processing the data may be automatically determined by considering specificities of the data. It should be noted that different embodiments may have different beneficial effects. In different embodiments, the possible beneficial effects may be any of the above, or the like, or any combination thereof, or any other beneficial effects that may be obtained.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended for those skilled in the art, though not expressly stated herein. These alterations, improvements, and modifications are intended to be suggested by this disclosure and are within the spirit and scope of the exemplary embodiments of this disclosure.

Meanwhile, certain terminology has been used to describe embodiments of the present disclosure. For example, the terms "one embodiment," "an embodiment," and/or "some embodiments" mean that a particular feature, structure, or characteristic described in connection with the embodiment is in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or terminal device.

Similarly, it should be appreciated that in the foregoing description of embodiments of the present disclosure, various features are sometimes grouped in a single embodiment, figure, or description thereof to streamline the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in smaller than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially". Unless otherwise stated, "about," "approximate," or "substantially" may indicate ±20% variation of the value it describes. Accordingly, in some embodiments, the numerical parameters set forth in the description and attached claims are approximations that may vary depending upon the desired properties sought to be obtained by a particular embodiment. In some embodiments, the numerical parameters should consider specified significant digits and adopt ordinary rounding techniques. Notwithstanding that the numerical ranges and parameters configured to illustrate the broad scope of some embodiments of the present disclosure are approximations, the numerical values in specific examples may be as accurate as possible within a practical scope.

Contents of each of patents, patent applications, publications of patent applications, and other materials, such as articles, books, specifications, publications, documents, or the like, referenced herein are hereby incorporated by reference, excepting any prosecution file history that is inconsistent with or in conflict with the present document, or any file (now or later associated with the present disclosure) that may have a limiting effect to the broadest scope of the claims. It should be noted that if the description, definition, and/or terms used in the appended materials of the present disclosure are inconsistent or conflicts with the content described in the present disclosure, the use of the description, definition, and/or terms of the present disclosure shall prevail.

Finally, it should be understood that the embodiments described in the present disclosure merely illustrate the principles of the embodiments of the present disclosure. Other modifications may be within the scope of the present disclosure. Accordingly, by way of example, and not limitation, alternative configurations of embodiments of the present disclosure may be considered to be consistent with the teachings of the present disclosure. Accordingly, the embodiments of the present disclosure are not limited to the embodiments explicitly introduced and described by the present disclosure.

I claim:

1. A method for determining a target data processing model, implemented on a computing device having at least one processor and at least one non-transitory storage medium, the method comprising: obtaining a data set including data to be processed by the target data processing model; inputting the data set into an evaluation model to obtain a score of each candidate data processing model of a plurality of candidate data processing models, the evaluation model being a trained machine learning model; determining a target data processing model from the plurality of candidate data processing models based on the score of each of at least a portion of the plurality of candidate data processing models, wherein the target data processing model is used to process the data set; and further comprising: in response to determining that one or more preset conditions are satisfied, obtaining the evaluation model, wherein the preset conditions include a second condition, the second condition is that a medical imaging process involves multiple operations, wherein different data sets are processed in different operations, and different evaluation models are used in the different operations, and the obtaining the evaluation model includes: for the data set in an operation of the multiple operations, obtaining a plurality of training samples corresponding to the operation to train the evaluation model corresponding to the operation, wherein the operation includes one of medical data acquisition, medical data correction, medical image generation, medical image reconstruction, motion artifact correction for a medical image, metal artifact correction for a medical image, scatter correction for a medical image, medical image segmentation, image post-processing, and diagnosis analysis, wherein the medical imaging process involves multiple operations, different data sets are processed in different operations, different evaluation models are used in the different operations, and the data set include characteristic data, and the method further comprising: in response to switching to a next operation of the medical imaging process, re-determining an evaluation model used in the next operation, wherein the next operation involves one of medical data acquisition, medical data correction, medical image generation, medical image reconstruction, motion artifact correction for a medical image, metal artifact correction for a medical image, scatter correction for a medical image, medical image segmentation, image post-processing, and diagnosis analysis; obtaining a plurality of training samples corresponding to the next operation to train the evaluation model used in the next operation; selecting one or more reference data processing models from the plurality of candidate data processing models according to the characteristic data, wherein the each candidate data processing model of the plurality of candidate data processing models has a label corresponding to the characteristic data; obtaining evaluation results of the one or more reference data processing models, wherein the evaluation results are scores; and in response to a highest score of the one or more reference data processing models is smaller than a preset score threshold, re-determining a scope of the one or more reference data processing models or a scope of the plurality of candidate data processing models.

2. The method of claim 1, wherein the data set includes characteristic data, and the determining the target data processing model includes:
 selecting, from the plurality of candidate data processing models, one or more reference data processing models based on the characteristic data, wherein the each candidate data processing model of the plurality of candidate data processing models has a label corresponding to the characteristic data; and
 determining, from the one or more reference data processing models, the target data processing model based on evaluation results of the one or more reference data processing models.

3. The method of claim 2, wherein the target data processing model is used for medical imaging technique, and the characteristic data includes one or more of: scanning parameters of a medical imaging device, image reconstruction parameters, a region of interest of a subject to be examined, or characteristic information of the subject.

4. The method of claim 2, further comprising:
 presenting the one or more reference data processing models to a user via a terminal device;
 obtaining a user input;
 determining or modifying, based on the user input, the one or more reference data processing models.

5. The method of claim 2, further comprising:
 in response to determining that a highest score of the one or more reference data processing models is smaller than a preset score threshold, re-determining a scope of the one or more reference data processing models or a scope of the plurality of candidate data processing models.

6. The method of claim 1, wherein the evaluation model is obtained by operations including:
 obtaining a plurality of training samples each including a sample data set and a sample score for at least one candidate data processing model of the plurality of candidate data processing models, wherein the sample score is determined based on a result of processing the sample data set using the at least one candidate data processing model; and
 obtaining the evaluation model by training an initial evaluation model based on the plurality of training samples.

7. The method of claim 1, further comprising:
 processing the data set using the target data processing model to obtain a data processing result; and
 causing a terminal device to present the data processing result to a user.

8. The method of claim 1, wherein an output of the at least two of the plurality of candidate processing models comprises at least two of: medical data acquisition, medical image reconstruction, medical image denoising, motion artifact correction for a medical image, metal artifact correction for a medical image, scatter correction for a medical image, medical image segmentation, or medical diagnosis.

9. The method of claim 1, wherein at least two of the plurality of candidate processing models are different in model structure or model parameters, and the plurality of candidate data processing models with different model parameters are trained machine learning models obtained based on different training sets.

10. The method of claim 1, wherein the preset conditions include a first condition, the first condition is that one or more reference data processing models are determined, and the determining the evaluation model includes: determining a plurality of training samples based on the reference data processing models, and obtaining the evaluation model by performing model training using the plurality of selected training samples.

11. A system, comprising: at least one non-transitory storage medium including a set of instructions for determining a target data processing model; and at least one processor in communication with the at least one non-transitory storage medium, wherein when executing the set of instructions, the at least one processor is configured to cause the system to perform operations including: obtaining a data set including data to be processed by the target data processing model; inputting the data set into an evaluation model to obtain a score of each candidate data processing model of a plurality of candidate data processing models, the evaluation model being a trained machine learning model; determining a target data processing model from the plurality of candidate data processing models based on the score of each of at least a portion of the plurality of candidate data processing models, wherein the target data processing model is used to process the data set; and further comprising: in response to determining that one or more preset conditions are satisfied, obtaining the evaluation model, wherein the preset conditions include a second condition, the second condition is that a medical imaging process involves multiple operations, wherein different data sets are processed in different operations, and different evaluation models are used in the different operations, and the obtaining the evaluation model includes: for the data set in an operation of the multiple operations, obtaining a plurality of training samples corresponding to the operation to train the evaluation model corresponding to the operation, wherein the operation includes one of medical data acquisition, medical data correction, medical image generation, medical image generation, medical image reconstruction, motion artifact correction for a medical image, metal artifact correction for a medical image, scatter correction for a medical image, medical image segmentation, image post-processing, and diagnosis analysis, wherein the medical imaging process involves multiple operations, different data sets are processed in different operations, different evaluation models are used in the different operations, and the data set include characteristic data, and the method further comprising: in response to switching to a next operation of the medical imaging process, re-determining an evaluation model used in the next operation, wherein the next operation involves one of medical data acquisition, medical data correction, medical image generation, medical image reconstruction, motion artifact correction for a medical image, metal artifact correction for a medical image, scatter correction for a medical image, medical image segmentation, image post-processing, and diagnosis analysis; obtaining a plurality of training samples corresponding to the next operation to train the evaluation model used in the next operation; selecting one or more reference data processing models from the plurality of candidate data processing models according to the characteristic data, wherein the each candidate data processing model of the plurality of candidate data processing models has a label corresponding to the characteristic data; obtaining evaluation results of the one or more reference data processing models, wherein the evaluation results are scores; and in response to a highest score of the one or more reference data processing models is smaller than a preset score threshold, re-determining a scope of the one or more reference data processing models or a scope of the plurality of candidate data processing models.

12. The system of claim 11, wherein the data set includes characteristic data, and the determining the target data processing model includes:
   selecting, from the plurality of candidate data processing models, one or more reference data processing models based on the characteristic data, wherein the each candidate data processing model of the plurality of candidate data processing models has a label corresponding to the characteristic data; and
   determining, from the one or more reference data processing models, the target data processing model based on evaluation results of the one or more reference data processing models.

13. The system of claim 11, wherein the evaluation model is obtained by operations including:
   obtaining a plurality of training samples each including a sample data set and a sample score for at least one candidate data processing model of the plurality of candidate data processing models, wherein the sample score is determined based on a result of processing the sample data set using the at least one candidate data processing model; and
   obtaining the evaluation model by training an initial evaluation model based on the plurality of training samples.

14. The system of claim 11, wherein the plurality of candidate processing models include machine learning models, and at least two of the plurality of candidate processing models are different in model structure or model parameters.

15. The system of claim 11, wherein the target data processing model processes the data set to obtain one or more of: medical data acquisition, medical image reconstruction, medical image denoising, motion artifact correction for a medical image, metal artifact correction for a medical image, scatter correction for a medical image, medical image segmentation, or medical diagnosis.

16. The system of claim 11, wherein the at least one processor is further configured to cause the system to perform operations including:
   processing the data set using the target data processing model to obtain a data processing result; and
   causing a terminal device to present the data processing result to a user.

17. A non-transitory computer readable medium, comprising at least one set of instructions, wherein when executed by at least one processor of a computing device, the at least one set of instructions direct the at least one processor to perform operations including: obtaining a data set including data to be processed by a target data processing model; inputting the data set into an evaluation model to obtain a score of each candidate data processing model of a plurality of candidate data processing models, the evaluation model being a trained machine learning model; determining a target data processing model from the plurality of candidate data processing models based on the score of each of at least a portion of the plurality of candidate data processing models, wherein the target data processing model is used to process the data set; and further comprising: in response to determining that one or more preset conditions are satisfied, obtaining the evaluation model, wherein the preset conditions include a second condition, the second condition is that a medical imaging process involves multiple operations, wherein different data sets are processed in different operations, and different evaluation models are used in the different operations, and the obtaining the evaluation model includes: for the data set in an operation of the multiple operations, obtaining a plurality of training samples corresponding to the operation to train the evaluation model corresponding to the operation, wherein the operation includes one of medical data acquisition, medical data correction, medical image generation, medical image reconstruction, motion artifact correction for a medical image, metal artifact correction for a medical image, scatter correction for a medical image, medical image segmentation, image post-processing, and diagnosis analysis, wherein the medical imaging process involves multiple operations, different data sets are processed in different operations, different evaluation models are used in the different operations, and the data set include characteristic data, and the method further comprising: in response to switching to a next operation of the medical imaging process, re-determining an evaluation model used in the next operation, wherein the next operation involves one of medical data acquisition, medical data correction, medical image generation, medical image reconstruction, motion artifact correction for a medical image, metal artifact correction for a medical image, scatter correction for a medical image, medical image segmentation, image post-processing, and diagnosis analysis; obtaining a plurality of training samples corresponding to the next operation to train the evaluation model used in the next operation; selecting one or more reference data processing models from the plurality of candidate data processing models according to the characteristic data, wherein the each candidate data processing model of the plurality of candidate data processing models has a label corresponding to the characteristic data; obtaining evaluation results of the one or more reference data processing models, wherein the evaluation results are scores; and in response to a highest score of the one or more reference data processing models is smaller than a preset score threshold, re-determining a scope of the one or more reference data processing models or a scope of the plurality of candidate data processing models.

* * * * *